(12) United States Patent
Baker (10) Patent No.: US 10,575,472 B2
(45) Date of Patent: Mar. 3, 2020

(54) BLADE ASSEMBLY FOR CUTTING ROOTS

(71) Applicant: Samuel James Baker, Florence, AL (US)

(72) Inventor: Samuel James Baker, Florence, AL (US)

(*) Notice: Subject to any disclaimer, the term of this patent is extended or adjusted under 35 U.S.C. 154(b) by 0 days.

(21) Appl. No.: 15/845,839

(22) Filed: Dec. 18, 2017

(65) Prior Publication Data

US 2018/0146625 A1 May 31, 2018

Related U.S. Application Data

(63) Continuation-in-part of application No. 14/880,877, filed on Oct. 12, 2015, now Pat. No. 9,844,189.

(51) Int. Cl.
*A01G 3/06* (2006.01)
*A01G 23/06* (2006.01)

(52) U.S. Cl.
CPC ............ *A01G 3/062* (2013.01); *A01G 23/067* (2013.01)

(58) Field of Classification Search
CPC ...... A01G 3/062; A01G 3/088; A01G 23/067; A01D 34/8355; A01D 34/84; A01D 42/00; Y10T 83/917
See application file for complete search history.

(56) References Cited

U.S. PATENT DOCUMENTS

| | | |
|---|---|---|
| 1,211,655 A | 1/1917 | Adams et al. |
| 1,354,828 A | 10/1920 | Leo |
| 1,461,376 A | 7/1923 | Bartlett |
| 1,718,325 A * | 6/1929 | Weaver ................ B27G 13/14 144/136.1 |
| 1,763,463 A * | 6/1930 | Garthe ................ B27G 13/14 144/222 |

(Continued)

FOREIGN PATENT DOCUMENTS

| | | |
|---|---|---|
| DE | 4009888 A1 | 10/1990 |
| GB | 1117624 A | 6/1968 |

OTHER PUBLICATIONS

Sally Drury, "Stump Grinders", Horticulture Week, Aug. 5, 2011, pp. 39-40, Haymarket Business Publications Ltd., Teddington, UK.

(Continued)

*Primary Examiner* — Tara Mayo-Pinnock
(74) *Attorney, Agent, or Firm* — Angela Holt; Bradley Arant Boult Cummings LLP (57) ABSTRACT

A blade assembly for cutting roots is installed on a hand-carried weed cutter or hand-carried sidewalk edger. The blade assembly comprises a rear blade configured to support a plurality of blades on the shaft of the weed cutter. The rear blade has a plurality of teeth disposed around its perimeter, and a central opening configured to be received by the shaft of the weed trimmer. A front blade has a plurality of teeth disposed around its perimeter. Stacks of grinding segments are sandwiched together between the rear blade and the front blade, each stack of grinding segments extending partially around the blade assembly at an angle. Each grinding segment has a plurality of teeth disposed along an outer edge of the grinding segment. Spacers without teeth are adjacent to and separate the stacks of grinding segments from one another. The spacers are also sandwiched between the rear blade and the front blade.

20 Claims, 7 Drawing Sheets

(56) References Cited

U.S. PATENT DOCUMENTS

| | | | |
|---|---|---|---|
| 2,775,856 A * | 1/1957 | Hoch | A01G 3/062 |
| | | | 172/14 |
| 3,082,802 A | 3/1963 | Dickson | |
| 3,323,567 A | 6/1967 | Segal | |
| 3,508,385 A | 4/1970 | Carlson | |
| 3,618,304 A | 9/1971 | Hundhausen | |
| 3,976,112 A | 8/1976 | Rowlson | |
| 4,300,336 A | 11/1981 | Miyata | |
| 4,589,458 A | 5/1986 | McCord, Jr. | |
| 4,679,385 A | 7/1987 | Carmine | |
| 4,697,625 A | 10/1987 | Bolton | |
| 4,703,786 A | 11/1987 | Doskocil | |
| 4,718,221 A | 1/1988 | Wessel et al. | |
| 4,757,848 A | 7/1988 | Mollberg, Jr. | |
| 4,783,914 A | 11/1988 | Bowling | |
| 5,005,619 A * | 4/1991 | Jensen | B27F 1/16 |
| | | | 144/230 |
| 5,309,962 A | 5/1994 | McCord, Jr. et al. | |
| 5,365,725 A | 11/1994 | McCance | |
| 5,368,078 A * | 11/1994 | Rupe | B27F 1/16 |
| | | | 144/218 |
| 5,613,566 A | 3/1997 | Cox et al. | |
| 5,857,505 A | 1/1999 | Zagar | |
| 6,076,265 A | 6/2000 | Huang Lo | |
| 6,092,608 A | 7/2000 | Leger | |
| 6,213,931 B1 | 4/2001 | Twardowski et al. | |
| 6,293,350 B1 | 9/2001 | Paolo | |
| 7,216,471 B1 | 5/2007 | Hassan | |
| 7,249,619 B2 | 7/2007 | Berkowitz et al. | |
| 7,367,367 B2 | 5/2008 | Bennington | |
| 8,186,135 B2 | 5/2012 | Leonardi et al. | |
| 8,196,623 B1 * | 6/2012 | Heath | A01G 23/067 |
| | | | 144/235 |
| 2006/0070506 A1 * | 4/2006 | Berkowitz | B23D 61/02 |
| | | | 83/838 |
| 2012/0180906 A1 | 7/2012 | Voyer | |

OTHER PUBLICATIONS

International Search Report and Written Opinion for International Patent Application No. PCT/US16/56576.

* cited by examiner

BLADE ASSEMBLY FOR CUTTING ROOTS

REFERENCE TO RELATED APPLICATIONS

This application is a continuation-in-part of, and claims priority to, U.S. Non-provisional patent application Ser. No. 14/880,877, titled "Blade for Cutting Roots," filed Oct. 12, 2015, which is incorporated herein by reference.

BACKGROUND AND SUMMARY OF THE INVENTION

A blade assembly for cutting roots is installed on a hand-carried weed cutter or hand-carried sidewalk edger. The blade assembly comprises a rear blade configured to support a plurality of blades on the shaft of the weed cutter. The rear blade has a plurality of teeth disposed around its perimeter, and a central opening configured to be received by the shaft of the weed trimmer. A front blade has a plurality of teeth disposed around its perimeter. Stacks of grinding segments are sandwiched together between the rear blade and the front blade, each stack of grinding segments extending partially around the blade assembly at an angle. Each grinding segment has a plurality of teeth disposed along an outer edge of the grinding segment. Spacers without teeth are adjacent to and separate the stacks of grinding segments from one another. The spacers are also sandwiched between the rear blade and the front blade.

In operation of the device, the cutter is moved in a back and forth motion over a root, left to right, then right to left. The front and rear blades have shorter blades than the grinding segments, and having shorter blades on the outside of the stack of blades helps to keep the larger blades from getting hung once the blades have begun making resurfacing cuts on the top part of the root.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

Figure 1:
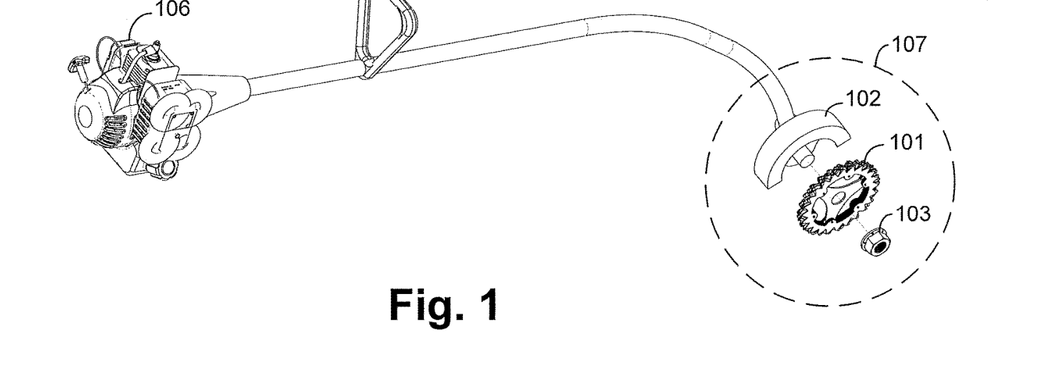
FIG. 1 is a perspective view of a weed cutter with a root cutting blade shown in exploded view.

FIG. 1 is a perspective view of a traditional weed cutter 100, but with a root cutting blade 101 (shown in exploded view) instead of a traditional weed cutting blade. The weed cutter 100 comprises a support 104 with a motor 106 on an upper end and a cutting end 107 on a lower end. A handle 105 is disposed on the support 104 between the motor 104 and the cutting end 107.

The cutting end 107 comprises a blade assembly 101 affixed to the shaft 109 by a nut 103. A shield 102 protects the user (not shown) from flying debris during operation of the cutter 100.

Figure 2:
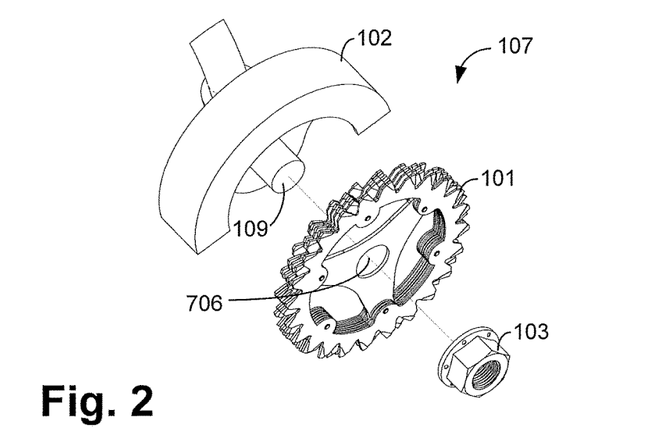
FIG. 2 is an enlarged view of the root cutting blade of FIG. 1.

FIG. 2 is an enlarged exploded view of the cutting end 107 of the cutter 100. The blade assembly 101 comprises an opening 706 that is received by a rotating shaft 109. The nut 103 that affixes the blade assembly 101 to the shaft 109 is a left handed nut in the illustrated embodiment. A compression washer (not shown) is disposed between the nut 103 and the blade assembly 101 in one embodiment.

Figure 3:
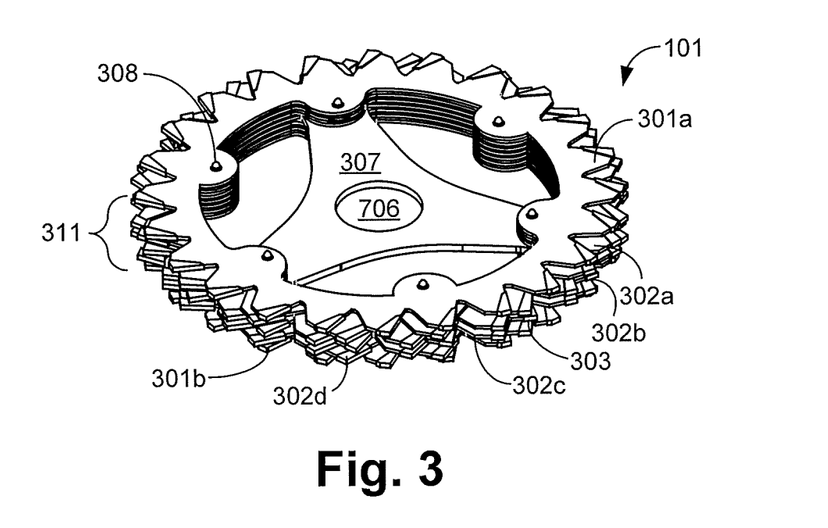
FIG. 3 is an enlarged perspective view of the blade assembly of FIG. 1.

FIG. 3 is an enlarged perspective view of the blade assembly 101 of FIG. 1. The blade assembly 101 comprises a central blade support 307. The blade support comprises the opening 706 that is received by the shaft 109 (FIG. 2). The central blade support 307 is described further herein with respect to FIG. 7.

A plurality of blades 301a-301b, 302a-302d, and 303 are affixed to the central blade support 307 via a plurality of fasteners 308. The plurality of blades 301a-301b, 302a-302d, and 303 are arranged in a "stack" 311, with blades 301a and 301b on the outsides (i.e., top and bottom) of the stack. The blades 301a and 301b comprise substantially identical blades described further herein with respect reference number 301 in FIG. 4.

Figure 5:
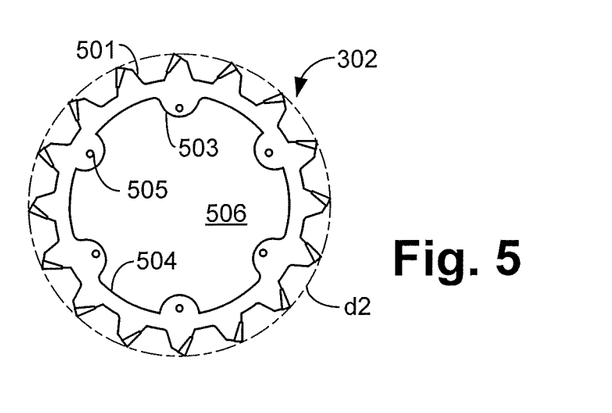
FIG. 5 is a side plan view of the cutting blades adjacent to the outermost cutting blades in the blade stack.

The blades 302a-302d comprise substantially identical blades described further herein with respect reference number 302 in FIG. 5. Blade 302a is the second blade in the stack 311, blade 302b is the third blade in the stack 311, blade 302c is the fifth blade in the stack 311, and blade 302d is the sixth blade in the stack 311. The blade 303 is described further herein with respect to FIG. 6. Blade 303 is in the middle of the stack 311, i.e., is the fourth blade in the stack.

Although the blade assembly 101 of FIG. 3 depicts seven blades 301a-301b, 302a-302d, and 303 arranged in the stack 311, in other embodiments there may be more or fewer blades.

Figure 4:
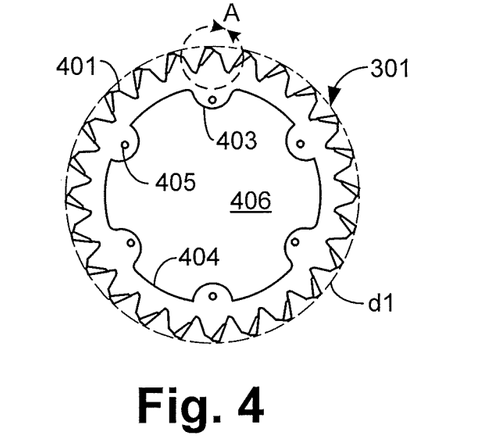
FIG. 4 is a side plan view of the outermost cutting blades in the blade stack.
Figure 8:
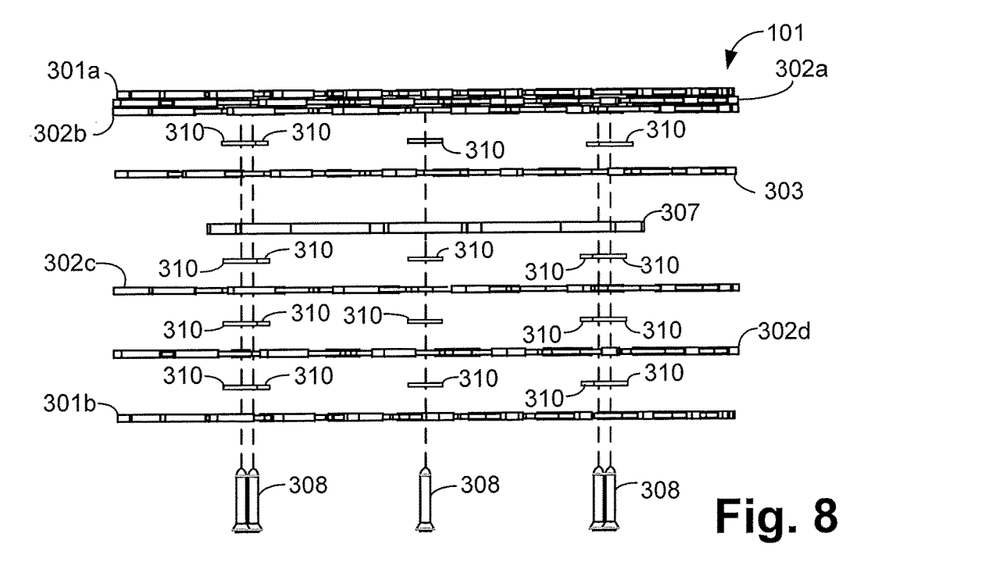
FIG. 8 is a partially-exploded view of the blade stack according to an embodiment of the present disclosure.
Figure 9:
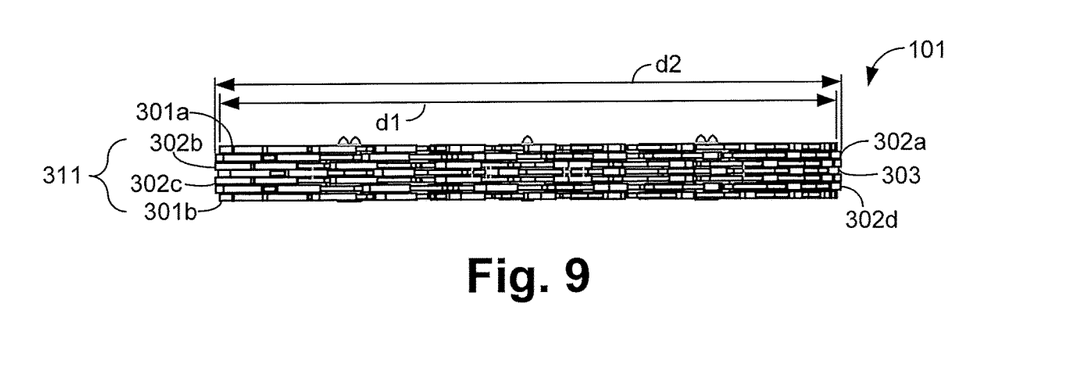
FIG. 9 is a side view of the blade assembly of FIG. 3.

FIG. 4 is a side plan view of the blade 301 (which is referred to as 301a and 301b to designate the location of the blades in FIGS. 3, 8 and 9). The blade 301 comprises a one piece, flat, unitary roughly disk-shaped blade with a plurality of individual teeth 401 extending outwardly in a radial direction from the center of the blade 301. The plurality of teeth 401 extend generally equidistantly from the center of the blade 301 to form an outer diameter "d1." In one embodiment, the diameter d1 is 5.38 inches. In other embodiments, the diameter d1 may be larger or smaller.

In the illustrated embodiment, the blade 301 comprises 24 teeth 401 spaced equidistantly apart around the perimeter of the blade 301. Other embodiments of the blade 301 may comprise more or fewer teeth 401.

The blade 301 comprises a central opening 406 and a generally circular inner edge 404. The opening 406 is between substantially 4.10 and 4.25 inches in one embodiment. A plurality of protrusions 403 extend from the inner edge 404 and comprise openings 405 for receiving fasteners 308 (FIG. 3). The protrusions are generally semi-circular in shape. In the illustrated embodiment, the blade 301 comprises six protrusions 403 for receiving six fasteners 308. In other embodiments, there may be more or fewer protrusions and more or fewer fasteners.

The blade 301 is between approximately 0.045-0.050 inches thick and formed from carbide-tipped steel in one embodiment, and may be other thicknesses and formed from other suitable materials in other embodiments.

Figure 4A:
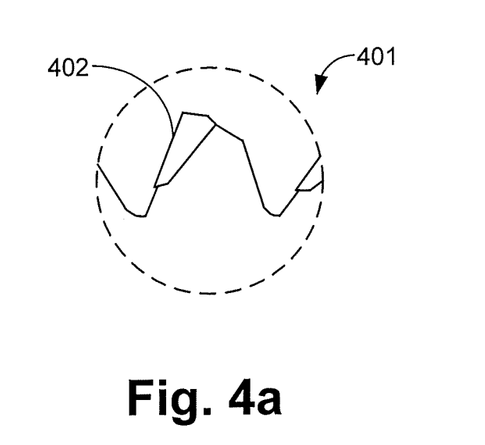
FIG. 4a is an enlarged view of a cutting blade of FIG. 4, taking along detail line "A" of FIG. 4.

FIG. 4a is an enlarged view of an exemplary blade tooth 401 of FIG. 4. Blade 301, 302, and central blade 303 are categorized as "Rip saw blades" with positive hook angles between 18 degrees to 22 degrees forward from the center line. Blade 301, 302, and central blade 303 each has a top clearance angle of 12 to 13 degrees from the top of the carbide tooth. Blades 302 and 303 have the same amount of teeth (16 teeth) and teeth spacing that ranges from 1.02 inches to 1.07 inches. Blade 301 has 24 teeth with teeth spacing ranging from 0.069 to 0.072 inches. Blade 301, 302, and 303 each has carbide teeth that has kerf ranging from 0.075 inches to 0.11 inches. The tooth configurations for all blades can be either "Alternate Top Bevel", beveled at 15 degrees on alternating sides on the top of the carbide tips, or "Triple Chip Grind" which is the standard flat top tooth configuration for rip saw blades.

FIG. 5 is a side plan view of the blade 302 (which is referred to as 302a-d to designate the location of the blades in FIGS. 3, 8 and 9). The blade 302 comprises a one piece, flat, unitary roughly disk-shaped blade with a plurality of individual teeth 501 extending outwardly in a radial direction from a center of the blade 302. The plurality of teeth 501 extend generally equidistantly from the center of the blade 302 to form an outer diameter "d2." In one embodiment, the diameter d2 is 5.50 inches. In other embodiments, the diameter d2 may be larger or smaller.

In the illustrated embodiment, the blade 302 comprises sixteen (16) teeth 501 spaced equidistantly apart around the perimeter of the blade 302. Other embodiments of the blade 301 may comprise more or fewer teeth 501. Note that the blade 302 having a smaller number of teeth 501 than the blade 301 means that many of the teeth 401 (FIG. 4) of the blade 301 will be offset from (i.e., not aligned with) the teeth 501 of the blade 302. This difference in the number of teeth in the blades 301 and 302 improves the root-cutting ability of the blade assembly 101.

The blade 302 comprises a central opening 506 and a generally circular inner edge 504. The opening 506 is substantially 4.10 to 4.25 inches in one embodiment. A plurality of protrusions 503 extend from the inner edge 504 and comprise openings 505 for receiving fasteners 308 (FIG. 3). The protrusions are generally semi-circular in shape. In the illustrated embodiment, the blade 302 comprises six protrusions 503 for receiving six fasteners 308. In other embodiments, there may be more or fewer protrusions and more or fewer fasteners.

The blade 302 is approximately 0.045-0.050 inches thick and formed from carbide-tipped steel in one embodiment, and may be other thicknesses and formed from other suitable materials in other embodiments.

Note that the protrusions 403 (FIG. 4) and openings 405 (FIG. 4) align of the blade 301 align with the protrusions 503 and openings 505 of the blade 302 when the blades are stacked as shown in FIG. 3 to form the blade assembly 101 (FIG. 3).

Figure 6:
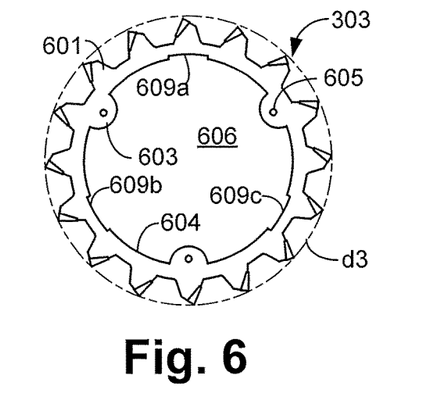
FIG. 6 is a side plan view of the central blade.

FIG. 6 is a side plan view of the blade 303, which comprises a one piece, flat, unitary roughly disk-shaped blade with a plurality of individual teeth 601 extending outwardly in a radial direction from a center of the blade 303. The plurality of teeth 601 extend generally equidistantly from the center of the blade 303 to form an outer diameter "d3." In one embodiment, the diameter d3 is 5.50 inches. In other embodiments, the diameter d3 may be larger or smaller.

In the illustrated embodiment, the blade 303 comprises sixteen (16) teeth 601 spaced equidistantly apart around the perimeter of the blade 303. Other embodiments of the blade 303 may comprise more or fewer teeth 601.

The blade 303 comprises a central opening 606 and a generally circular inner edge 604. The opening 606 is substantially 4.10 to 4.25 inches in one embodiment. A plurality of protrusions 603 extend from the inner edge 604 and comprise openings 605 for receiving fasteners 308 (FIG. 3). The protrusions 603 are generally semi-circular in shape. In the illustrated embodiment, the blade 303 comprises three protrusions 603 for receiving three fasteners 308. In other embodiments, there may be more or fewer protrusions and more or fewer fasteners.

The blade 303 is approximately 045-0.050 inches thick and formed from carbide-tipped steel in one embodiment, and may be other thicknesses and formed from other suitable materials in other embodiments.

Note that the protrusions 603 and openings 605 align with three of the six protrusions 503 (FIG. 5) and 403 (FIG. 4) and openings 505 (FIG. 5) and openings 405 (FIG. 4) of the blades 301 and 302 when the blades are stacked as shown in FIG. 3 to form the blade assembly 101 (FIG. 3), as further discussed herein.

The blade 303 further comprises indentations 609a, 609b, and 609c, one of each being disposed between adjacent protrusions 603. The indentations 609a, 609b, and 609c comprise a curved surface that receives the blade support 307, as further described with respect to FIG. 7 herein.

Figure 7:
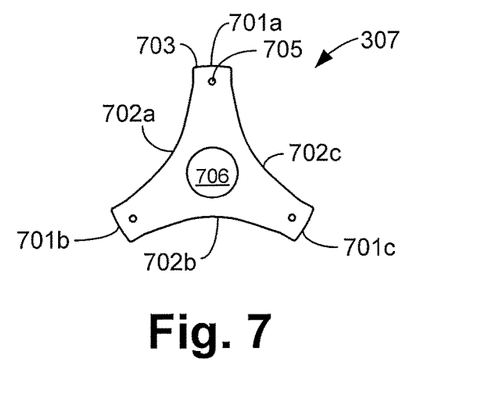
FIG. 7 is a side plan view of the blade support.

FIG. 7 is a side plan view of the blade support 307. The blade support 307 is roughly triangle shaped with three legs 701a, 701b, and 701c extending from a central opening 706 and spaced generally equidistant from one another. The central opening 706 is sized to be installed on the shaft 109 (FIG. 2).

Curved side 702a extends between the leg 701a and the leg 702b; curved side 702b extends between the leg 701b and the leg 701c; and curved side 702c extends between the leg 701c and the leg 701a. The legs 701a, 701b, and 701c each comprise a curved surface 703 that joins with the curved surfaces of the indentations 609a, 609b, and 609c. In other words, the indentation 609a receives the leg 701a; the indentation 609b receives the leg 701b, and the indentation 609c receives the leg 701c.

Each leg 701a, 701b, and 701c comprises an opening 705 which receives a fastener 308 (FIG. 3). The openings 705 in the legs 701a, 701b, and 701c align with alternate openings 505 (FIG. 5) and openings 405 (FIG. 4) of the blades 301 and 302 when the blades are stacked as shown in FIG. 3 to form the blade assembly 101 (FIG. 3), as further discussed herein.

The blade support 307 is approximately 0.085-0.092 inches thick and formed from steel in one embodiment, and may be other thicknesses and formed from other suitable materials in other embodiments.

FIG. 8 is a partially exploded side view of the blade assembly 101 of FIG. 3, showing how the blades 301a-b, 302a-d, and 303 are stacked together and joined by fasteners 308. As discussed herein, the blades 301a and 301b are on the outer sides of the blade assembly 101. The blade 302a is next to the blade 301a, followed by the blade 302b. Next in the stack is the central blade 303, which fits onto the blade support 307. The blade 303 and blade support 307 are in the middle of the stack 311 and are sandwiched between the blade 302b and blade 302c. The blade 302d is adjacent to the blade 302c, and the blade 301b completes the stack.

Spacers 310 are disposed between adjacent blades. The spacers 310 are small aluminum washers in the illustrated embodiment. The spacers are 0.32 to 0.37 inches in outside diameter and 0.03-0.06 inches thick in one embodiment. Each spacer 310 comprises a central opening (not shown) to receive the fastener 308. The fasteners 308 are standard rivets in the illustrated embodiment.

FIG. 9 is a side view of the blade assembly 101 showing the stack 311. Note that the diameter d1 of the blade 301a (and 301b) is less than the diameter d2 of the blade 302a (and 302b, c, and d). In one embodiment, the diameter of the blades 301a and 301b are 5.38 inches and the diameter of the blades 302a-d and blade 303 are 5.50 inches. The outer blades 301a and 301b being smaller in diameter than the inner blades 302a-d improves the root-cutting action of the blade assembly 101. The outer blades 301a and 301b being smaller in diameter than the inner blades 302a-d promotes more smooth cutting of roots. This is because in operation of the device, the blade assembly 101 is passed back and forth over the root/stump to be cut. The shorter blades on the outside of the stack 311 help the larger blades on the inside from getting hung up on the roots.

The diameter d3 is the same as the diameter d2 of blades 302 a-d. When fully assembled, the stack 311 is between ¾ inches and one inch thick in one embodiment.

Figure 10:
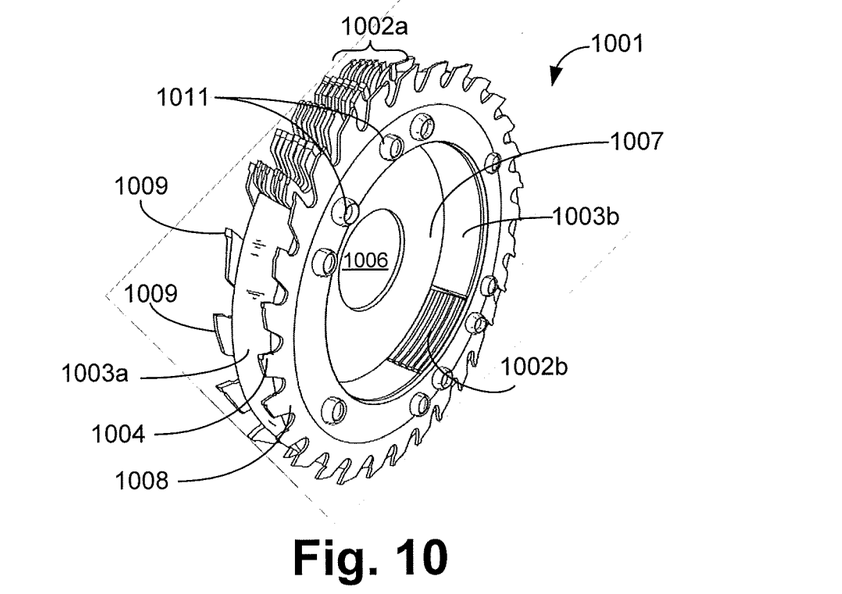
FIG. 10 is a perspective view of an alternative embodiment of a blade assembly installed on a shaft of a weed trimmer.

FIG. 10 is a perspective view of an alternative embodiment of a blade assembly 1001 that is installed on a shaft (not shown) of a cutter (not shown) in the same manner that the blade assembly 101 (FIG. 1) is installed on the cutter 100 (FIG. 1). The blade assembly 1001 comprises a rear blade 1007. The rear blade 1007 is disposed on a rear side of the assembly 1001 and supports the blade assembly 1001 on the shaft (not shown) of the cutter (not shown) and comprises a central opening 1006 that receives the shaft. The central opening 1006 is sized slightly larger than the shaft 109 (FIG. 2). The rear blade 1007 further comprises a plurality of teeth 1009 extending outwardly to contact items to be cut, as further discussed herein. The teeth 1009 extend radially from the rear blade 1007 around an outer perimeter of the rear blade 1007, and are integral with the rear blade 1007.

A front blade 1008 is disposed on a front side of the assembly 1001. The front blade 1008 comprises a central opening sized larger than the central opening 1006 of the rear blade 1007, as illustrated. The front blade 1008 comprises a plurality of teeth 1004 extending outwardly, the teeth 1004 similar to the teeth 1009; however, in the illustrated embodiment, the front blade has more teeth than the rear blade, as further discussed herein. The teeth 1004 extend radially from the front blade 1008 and are integral with the front blade 1008.

The blade assembly 1001 further comprises a plurality of stacks 1002a and 1002b of grinding segments 1002 sandwiched between the rear blade 1007 and front blade 1008. The grinding segments 1002 comprise arc-shaped blade segments, and a plurality of grinding segments 1002 are stacked together to form a stack 1002a or 1002b. The stack 1002a is disposed substantially 180 degrees apart from the stack 1002b. Each of the stacks 1002a and 1002b comprises approximately 45 degrees of the blade assembly 1001 in the illustrated embodiment, as further discussed herein. Spacers 1003a and 1003b are sandwiched between the rear blade 1007 and front blade 1008 in areas where there are no stacks 1002a and 1002b. The blades are affixed together in the assembly 1001 via a plurality of fasteners 1011.

Although the blade assembly 1001 of FIG. 10 depicts two stacks 1002a and 1002b and two sets of spacers 1003a and 1003b, in other embodiments there may be more or fewer sets of grinding segments and spacers.

Figure 11:
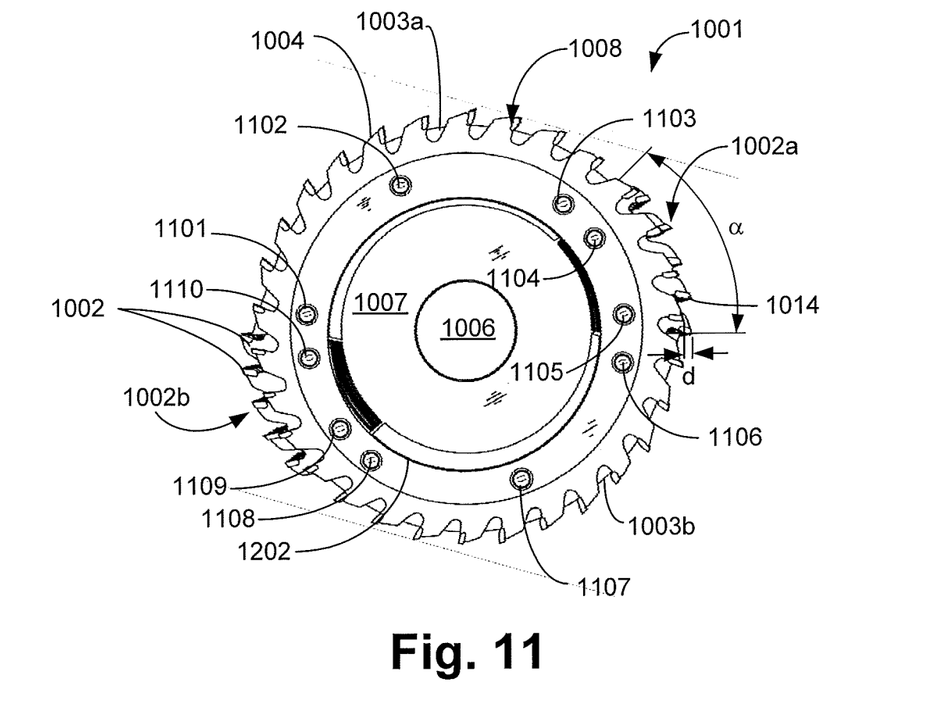
FIG. 11 is a front view of the blade assembly of FIG. 10.

FIG. 11 is a front perspective view of the blade assembly 1001 of FIG. 10. The front blade 1008 comprises a central opening 1012 that is larger than the central opening 1006 of the rear blade 1007, as shown. Each of the stacks 1002a and 1002b span an angle α, which is 45 degrees in the illustrated embodiment. In other embodiments, the stacks may span a different angle, and may be between 22.5 and 70 degrees in other embodiments. As discussed above, the grinding segments 1002a are disposed 180 degrees apart from the grinding segments 1002b. Each of the spacers 1003a and 1003b generally spans an angle of 180-α, which is 135 degrees in the illustrated embodiment.

The teeth 1014 of the grinding segments 1002 in the stacks 1002a and 1002b extend outwardly further than the teeth 1004 of the front blade 1008 and the teeth 1009 of the rear blade 1007 by a distance "d" as shown. In one embodiment, the distance d is 0.125 inches.

A plurality of fasteners 1101-1110 affix the front blade 1008, rear blade 1007, stacks 1002a and 1002b, and spacers 1003a and 1003b together. Specifically, the fasteners 1101-1103 secure the spacer 1003a between the front blade 1008 and rear blade 1007; the fasteners 1104 and 1105 secure the stack 1002a a between the front blade 1008 and rear blade 1007; the fasteners 1106-1108 secure the spacer 1003b between the front blade 1008 and rear blade 1007; and the fasteners 1109 and 1110 secure the stack 1002b between the front blade 1008 and rear blade 1007.

Figure 12:
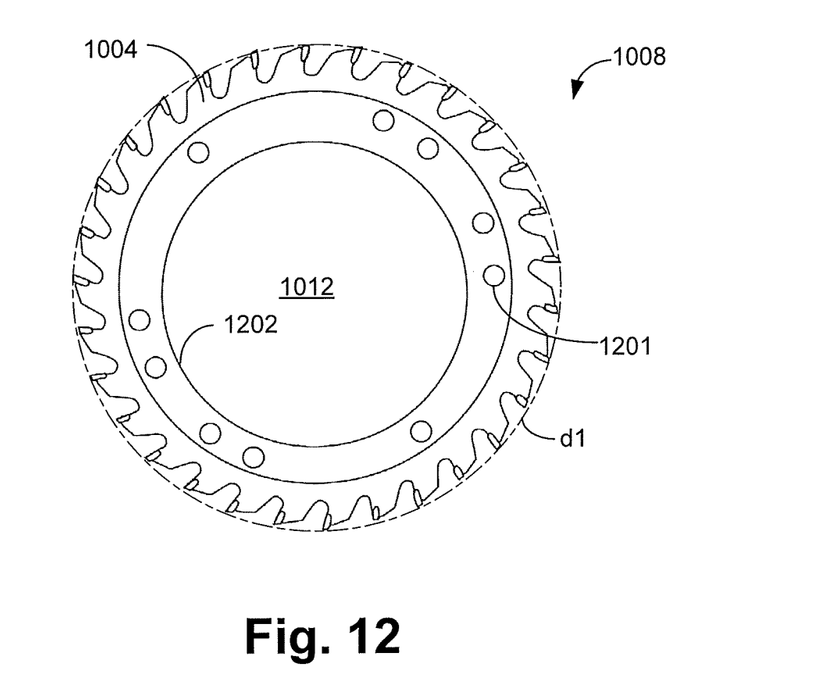
FIG. 12 is a side plan view of the front blade of FIG. 10.

FIG. 12 is a side plan view of the front blade 1008 of FIG. 10. The blade 1008 comprises a one piece, generally flat, unitary roughly disk-shaped blade with a plurality of individual teeth 1004 extending outwardly in a radial direction from the center of the blade 1008. The plurality of teeth 1004 extend generally equidistantly from the center of the blade 1008 to form an outer diameter "d1." In one embodiment, the diameter d1 is 4.375 inches. In other embodiments, the diameter d1 may be larger or smaller.

In the illustrated embodiment, the blade 1008 comprises 30 teeth 1004 spaced equidistantly apart around the perimeter of the blade 1008. Other embodiments of the blade 1008 may comprise more or fewer teeth 1004.

The blade 1008 comprises a central opening 1012 and a generally circular inner edge 1202. The opening 1012 is between substantially 2.60 and 2.65 inches in one embodiment. The blade 1008 further comprises openings 1201 for receiving fasteners (not shown). In the illustrated embodiment, the blade 1008 comprises ten (10) openings for receiving fasteners. In other embodiments, there may be more or fewer openings for receiving more or fewer fasteners.

The blade 1008 is between approximately 0.045-0.050 inches thick and formed from carbide-tipped steel in one embodiment, and may be other thicknesses and formed from other suitable materials in other embodiments.

Figure 13:
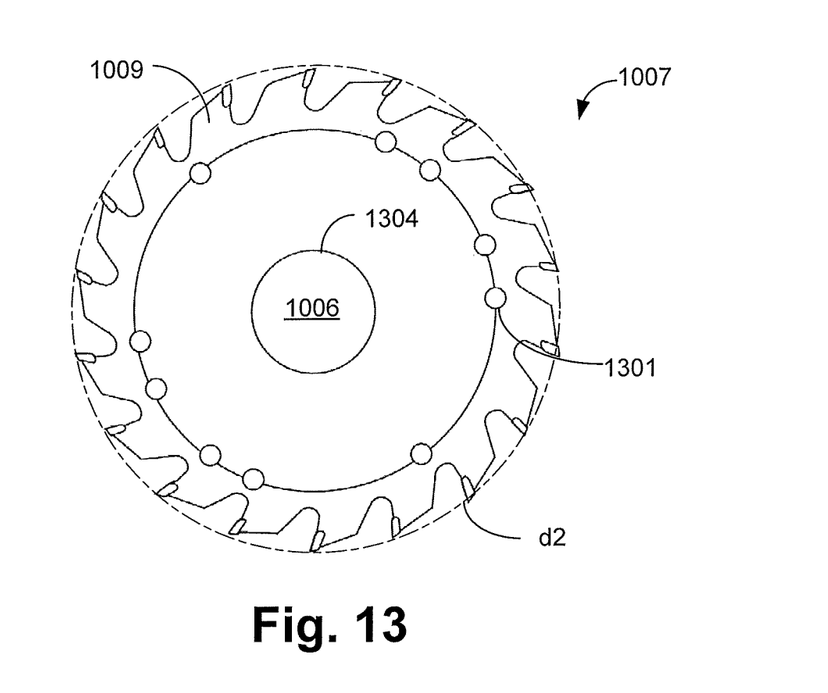
FIG. 13 is a side plan view of the rear blade of FIG. 10.

FIG. 13 is a side plan view of the rear blade 1007, which comprises a one piece, flat, unitary roughly disk-shaped blade with a plurality of individual teeth 1009 extending outwardly in a radial direction. The plurality of teeth 1009 extend generally equidistantly from the center of the blade 1007 to form an outer diameter "d2." In one embodiment, the diameter d2 is 4.375 inches. In other embodiments, the diameter d2 may be larger or smaller.

In the illustrated embodiment, the blade 1007 comprises eighteen (18) teeth 1009 spaced equidistantly apart around the perimeter of the blade 1007. Other embodiments of the blade 1007 may comprise more or fewer teeth 1009. Note that the blade 1007 having a smaller number of teeth 1009 than the blade 1008 (FIG. 12) means that many of the teeth 1004 (FIG. 12) of the blade 1008 will be offset from (i.e., not aligned with) the teeth 1009 of the blade 1007. This difference in the number of teeth in the blades 1007 and 1008 improves the cutting ability of the blade assembly 1001 (FIG. 10).

The blade 1007 comprises a central opening 1006 and a generally circular inner edge 1304. The opening 1006 is between substantially 1.00 and 1.06 inches in one embodiment. The blade 1007 further comprises openings 1301 for receiving fasteners (not shown). In the illustrated embodiment, the blade 1007 comprises ten (10) openings for receiving fasteners. In other embodiments, there may be more or fewer openings for receiving more or fewer fasteners.

The blade 1007 is approximately 0.045-0.050 inches thick and formed from carbide-tipped steel in one embodiment, and may be other thicknesses and formed from other suitable materials in other embodiments.

Note that the openings 1201 (FIG. 12) align of the blade 1008 align with the openings 1301 of the blade 1007 when the blades are stacked as shown in FIG. 10 to form the blade assembly 1001 (FIG. 10).

Figure 14:
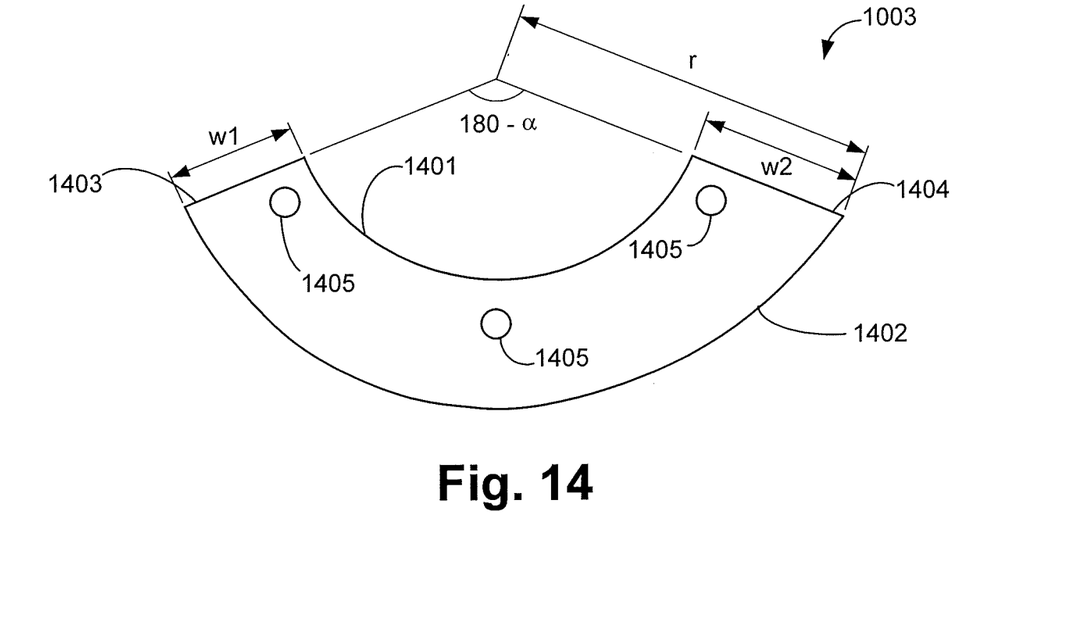
FIG. 14 is a side plan view of a spacer of FIG. 10.

FIG. 14 is a side plan view of a spacer 1003 of FIG. 10. The spacer 1003 comprises a semi-circular (i.e., arc-shaped) body, formed from plastic in one embodiment. The spacer 1003 may be formed from other materials that are suitably rigid and lightweight. The spacer 1003 comprises a concave inner edge 1401 that is generally aligned with the inner edge 1202 (FIG. 12) of the front blade 1008 when the spacer 1003 is part of the blade assembly 1001 (FIG. 10).

A leading side edge 1403 and a following side edge 1404 bound the spacer 1003. The leading side edge 1403 is the edge that leads when the blade assembly is in operation. The leading side edge 1403 and following side edge 1404 are angled such that the spacers 1003a and 1003b "fit" together with the grinding segments 1002a and 1002b as shown in FIGS. 10 and 11 to form a general circular shape. One spacer 1003a or 1003b beside one grinding segment 1002a or 1002b forms a general half-circular shape. In other words, the side edge 1403 is disposed at an angle of 180–α to the side edge 1404, where α is the angle formed by the side edges of the grinding segments 1002a and 1002, as further discussed herein.

In the illustrated embodiment, the leading side edge 1403 has a width "w1," which is about 0.55 inches, that is slightly narrower than the following side edge 1404, which has a width "w2," which is equal to 0.70 inches. This means that a radius "r" measured from a center of the blade assembly increases from the side edge 1403 to the side edge 1404. The difference between w1 and w2 is about 0.15 inches in one embodiment. The change in radius of the spacer 1003 helps to keep the teeth of the blades and grinding segments free of debris on the cutting side of the grinding segments, and keeps wood from getting clogged in the spaces between the grinding segments.

The spacer 1003 further comprises a convex outer edge 1402. As can be seen in FIGS. 10 and 11, when the spacer 1003 is assembled in the blade assembly 1001, the outer edge 1402 of the spacer 1003 extends from a center of the assembly 1001 to a point inward from the outer edges of the front and rear blades (represented by d1 and d2, respectively, see FIGS. 12-13). Further, the outer edge 1402 of the spacer 1003 extends inward from the outer edges of the stacks 1002a and 1002b.

The spacer 1003 comprises a plurality of openings 1405 for receiving the fasteners that affix the blade assembly 1001 together, as further discussed herein. In the illustrated embodiment, the spacer 1003 comprises three (3) openings 1405. In other embodiments, there may be more or fewer openings 1405 for receiving more or fewer fasteners.

The spacer 1003 is 0.50 inches thick in one embodiment and may be other thicknesses in other embodiments. The spacer 1003 is sized to be the same thickness as the stack of grinding segments 1002, as further discussed herein.

Figure 15:
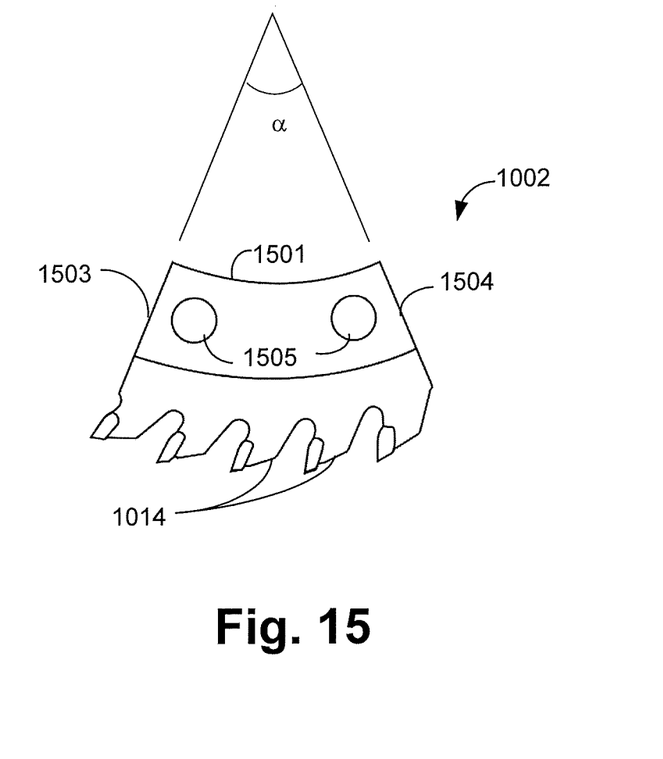
FIG. 15 is a side plan view of a grinding segment of FIG. 10.

FIG. 15 is a side plan view of a grinding segment 1002 of FIG. 10. The grinding segment 1002 comprises a semi-circular (i.e., arc-shaped) body with teeth 1014 extending radially outwardly. The grinding segment 1002 further comprises a concave inner edge 1501 that is generally aligned with the inner edge 1202 (FIG. 12) of the front blade 1008 when the grinding segments 1002a and 1002b are part of the blade assembly 1001 (FIG. 10). In the illustrated embodiment, when the grinding segment 1002 is assembled in the blade assembly 1001, the teeth 1014 extend from a center of the assembly 1001 to a point outward from the outer edges of the front and rear blades (represented by d1 and d2, respectively, see FIGS. 12-13).

Side edges 1503 and 1504 bound the grinding segment 1002, and are angled such that the spacers 1003a and 1003b are adjacent to and "fit" together with the grinding segments 1002a and 1002b as shown in FIGS. 10 and 11 to form a general circular shape, and one spacer 1003a or 1003b beside one grinding segment 1002a or 1002b forms a general half-circular shape. In other words, the side edge 1503 is disposed at an angle of α to the side edge 1504.

The grinding segment 1002 comprises a plurality of openings 1505 for receiving the fasteners that affix the blade assembly 1001 together, as further discussed herein. In the illustrated embodiment the grinding segment 1002 comprising two (2) openings for receiving fasteners, though in other embodiments there may be more than two openings to receive more fasteners.

The grinding segment 1002 is approximately 045-0.050 inches thick and formed from carbide-tipped steel in one embodiment, and may be other thicknesses and formed from other suitable materials in other embodiments.

Figure 16:
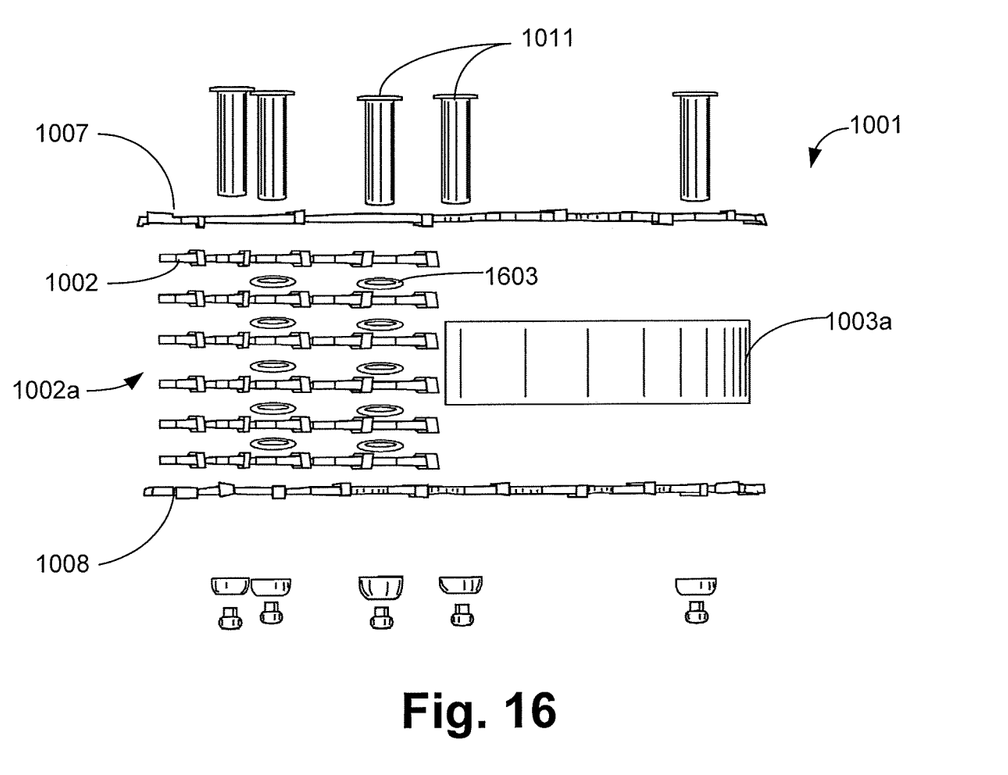
FIG. 16 is a partially exploded side view of the blade assembly of FIG. 10.

FIG. 16 is a partially exploded side view of the blade assembly 1001 of FIG. 10, showing how the blades 1007, 1008, stacks 1002a, and spacers 1003a are stacked together and joined by fasteners 1011. (Stacks 1002b and spacer 1003b are not shown in this figure.) As discussed herein, the blade 1007 is on rear of the assembly 1001. The blade 1008 is on the front of the assembly. The spacer 1003a is sandwiched between the rear blade 1007 and the front blade 1008.

The grinding segments 1002 are disposed in a stack 1002a adjacent to the spacer 1003a. In one embodiment, six (6) grinding segments 1002 are in the stack 1002a. In other embodiments, more or fewer grinding segments 1002 may be used; provided, however, that the thickness of the stack 1002a should be equal to the thickness of the spacer 1003a.

A plurality of spacing washers 1603 are disposed between adjacent grinding segments 1002a. Each spacing washer 1603 comprises a central opening (not shown) to receive the fastener 1011. The fasteners 1011 extend through the openings in the blades and spacer and the spacing washers. The fasteners 1011 are standard rivets in the illustrated embodiment.

Figure 17:
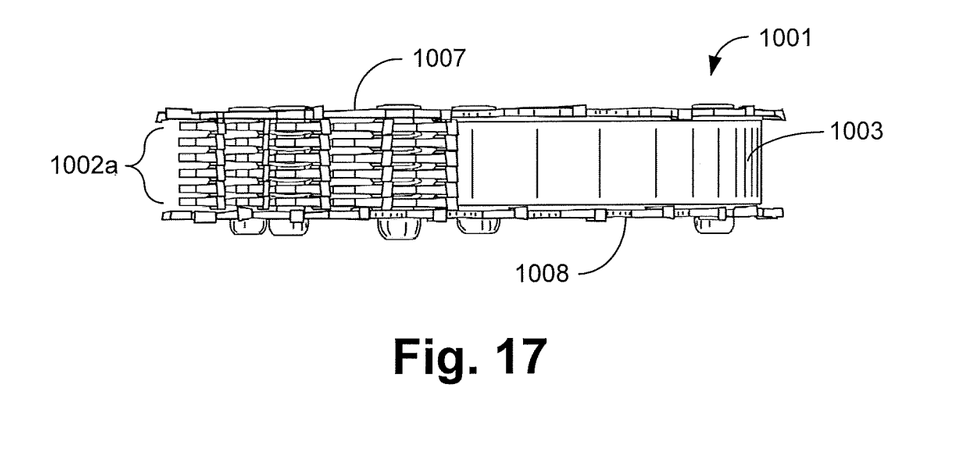
FIG. 17 is a side view of the blade assembly of FIG. 10.

FIG. 17 is a side view of the blade assembly 1001 of FIG. 10. Although not shown in FIG. 17 because of the angle of the drawing view, the teeth 1014 (FIG. 15) of the grinding segments 1002a extend outwardly further than the teeth of the front blade 1007 and the teeth of the rear blade 1008, as shown in FIG. 10.

The invention claimed is:

1. A blade assembly comprising:
 a rear blade configured to support a plurality of blades on the shaft of a weed trimmer, the rear blade comprising a plurality of teeth disposed around a perimeter of the rear blade, the rear blade comprising a central opening configured to be received by the shaft of the weed trimmer;
 a front blade comprising a plurality of teeth disposed around a perimeter of the front blade;
 two stacks of grinding segments sandwiched together between the rear blade and the front blade, each stack of grinding segments extending partially around a periphery of the blade assembly at an angle α degrees, each grinding segment comprising a plurality of teeth disposed along its outer edge, each grinding segment comprising angled side edges;
 two spacers, the spacers sandwiched between the rear blade and the front blade, the spacers adjacent the stacks of grinding segments, each spacer comprising angled side edges, the angled side edges of the spacers adjacent the angled side edges of the grinding segments, each spacer extending around the periphery of the blade assembly at an angle of 180 degrees−α degrees, the spacers not comprising teeth.

2. The blade assembly of claim 1, the front blade comprising a larger number of teeth than the rear blade.

3. The blade assembly of claim 1, wherein the teeth of the grinding segments extend outwardly further than the teeth of the front blade and the teeth of the rear blade.

4. The blade assembly of claim 1, wherein the angle α is between 22.5 degrees and 70 degrees.

5. The blade assembly of claim 1, wherein an outer edge of the spacers extends to a point inward from the outer edges of the front and rear blades.

6. The blade assembly of claim 5, wherein each spacer comprises a leading side edge and a following side edge, wherein the leading side edge is narrower than the following side edge, such that the outer edge of the spacers increases in radius from the leading side edge to the following side edge.

7. A blade assembly comprising:
 a rear blade configured to support a plurality of blades on the shaft of a weed trimmer, the rear blade comprising a plurality of teeth disposed around a perimeter of the rear blade, the rear blade comprising a central opening configured to be received by the shaft of the weed trimmer;
 a front blade comprising a plurality of teeth disposed around a perimeter of the front blade;
 a plurality of stacks of grinding segments sandwiched together between the rear blade and the front blade, each stack of grinding segments extending partially around the blade assembly at an angle α degrees, each grinding segment comprising a plurality of teeth disposed along an outer edge of the grinding segment, each grinding segment comprising angled side edges;
 a plurality of spacers, the spacers sandwiched between the rear blade and the front blade, the spacers adjacent to and separating the stacks of grinding segments around a periphery of the blade assembly, the spacers not comprising teeth, each spacer comprising angled side edges, the angled side edges of the spacers adjacent the angled side edges of the grinding segments.

8. The blade assembly of claim 7, each spacer extending around the blade assembly at an angle of 180 degrees−α degrees.

9. The blade assembly of claim 7, front blade comprising more teeth than the rear blade.

10. The blade assembly of claim 7, wherein the teeth of the grinding segments extend outwardly further than the teeth of the front blade and the teeth of the rear blade.

11. The blade assembly of claim 7, wherein the angle α is between 22.5 degrees and 70 degrees.

12. The blade assembly of claim 7, wherein an outer edge of the spacers extends to a point inward from the outer edges of the front and rear blades.

13. The blade assembly of claim 12, wherein each spacer comprises a leading side edge and a following side edge, wherein the leading side edge is narrower than the following side edge, such that the outer edge of the spacers increases in radius from the leading side edge to the following side edge.

14. A blade assembly comprising:
 a support blade configured to support a plurality of blades on the shaft of a weed trimmer, the support blade comprising a plurality of teeth disposed around a perimeter of the support blade, the support blade comprising a central opening configured to be received by the shaft of the weed trimmer;
 a cutting blade comprising a plurality of teeth disposed around a perimeter of the cutting blade, the cutting blade connected to the support blade;
 a plurality of stacks of grinding segments sandwiched together between the cutting blade and the support blade, each stack of grinding segments comprising a plurality of blades sandwiched together, each stack of grinding segments extending partially around a periphery of the blade assembly, each grinding segment comprising a plurality of teeth disposed along its outer edge, each grinding segment comprising angled side edges;
 a plurality of spacers, the spacers sandwiched between the cutting blade and the support blade, the spacers adjacent to and separating the stacks of grinding segments around the periphery of the blade assembly, the spacers not comprising teeth, each spacer comprising angled side edges, the angled side edges of the spacers adjacent the angled side edges of the grinding segments.

15. The blade assembly of claim 14, wherein each stack of grinding segments extends partially around the periphery of the blade assembly an angle α.

16. The blade assembly of claim 15, each spacer extending around the periphery of the blade assembly at an angle of 180 degrees–α degrees.

17. The blade assembly of claim 14, the cutting blade comprising more teeth than the support blade.

18. The blade assembly of claim 14, wherein the teeth of the grinding segments extend outwardly further than the teeth of the cutting blade and the teeth of the support blade.

19. The blade assembly of claim 14, wherein an outer edge of the spacers extends to a point inward from the outer edges of the cutting and support blades.

20. The blade assembly of claim 14, wherein each spacer comprises a leading side edge and a following side edge, wherein the leading side edge is narrower than the following side edge, such that the outer edge of the spacers increases in radius from the leading side edge to the following side edge.

\* \* \* \* \*